United States Patent [19]
Hamada

[11] Patent Number: 5,959,759
[45] Date of Patent: *Sep. 28, 1999

[54] MULTIPLE BEAM SCANNING OPTICAL SYSTEM

[75] Inventor: Akiyoshi Hamada, Toyokawa, Japan

[73] Assignee: Minolta Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/697,884

[22] Filed: Sep. 3, 1996

[30] Foreign Application Priority Data

Sep. 7, 1995 [JP] Japan .................................. 7-229818

[51] Int. Cl.$^6$ .................................................. G02B 26/08
[52] U.S. Cl. .......................... 359/204; 359/196; 359/210; 359/739; 359/820
[58] Field of Search .................................. 359/196, 197, 359/204, 210, 217, 739, 820, 822, 823

[56] References Cited

U.S. PATENT DOCUMENTS

| | | | |
|---|---|---|---|
| 1,325,936 | 12/1919 | Fouasse | 359/820 |
| 2,533,478 | 12/1950 | Lee et al. | 396/529 |
| 3,671,108 | 6/1972 | Kilgus | 359/820 |
| 4,303,306 | 12/1981 | Ookawa | 359/819 |
| 4,720,168 | 1/1988 | Kaneko | 359/820 |
| 4,815,059 | 3/1989 | Nakayama et al. | 359/820 |
| 4,855,987 | 8/1989 | Versluis | 369/112 |
| 5,146,367 | 9/1992 | Newman | 359/820 |
| 5,210,650 | 5/1993 | O'Brien et al. | 359/820 |
| 5,233,455 | 8/1993 | Yamaguchi et al. | 359/820 |
| 5,258,873 | 11/1993 | Mishina et al. | 359/654 |
| 5,283,695 | 2/1994 | Ziph-Schatzberg et al. | 359/820 |
| 5,300,956 | 4/1994 | Ohta et al. | 347/233 |
| 5,313,333 | 5/1994 | O'Brien et al. | 352/820 |
| 5,471,236 | 11/1995 | Ito | 347/233 |
| 5,517,330 | 5/1996 | Maeda | 359/197 |
| 5,570,224 | 10/1996 | Endo et al. | 359/196 |
| 5,661,587 | 8/1997 | Iwasaki | 359/196 |

FOREIGN PATENT DOCUMENTS

| | | | |
|---|---|---|---|
| 680532 | 2/1964 | European Pat. Off. | |
| 4-119313 | 4/1992 | Japan | 359/197 |

*Primary Examiner*—Cassandra Spyrou
*Assistant Examiner*—Darren Schuberg
*Attorney, Agent, or Firm*—Burns, Doane, Swecker & Mathis, LLP

[57] ABSTRACT

An optical unit provided between a plurality of light sources and a deflecting system in a multiple beam scanning optical system in which the appropriate intensity and appropriate intensity distribution of each beam on the scanned surface change are maintained regardless of foreseen changes in ambient temperature. The optical unit includes a condenser lens which condenses the beams emitted from the light sources and an aperture which regulates diameters of beams projected from the condenser lens. A connecting member which connects the condenser lens and the aperture at a distance corresponding to a focal length of the condenser lens. The connecting member is formed of material or materials whose amount of linear expansion per unit of temperature is approximately equal to an amount of change in the focal length of the condenser lens per unit of temperature

31 Claims, 3 Drawing Sheets

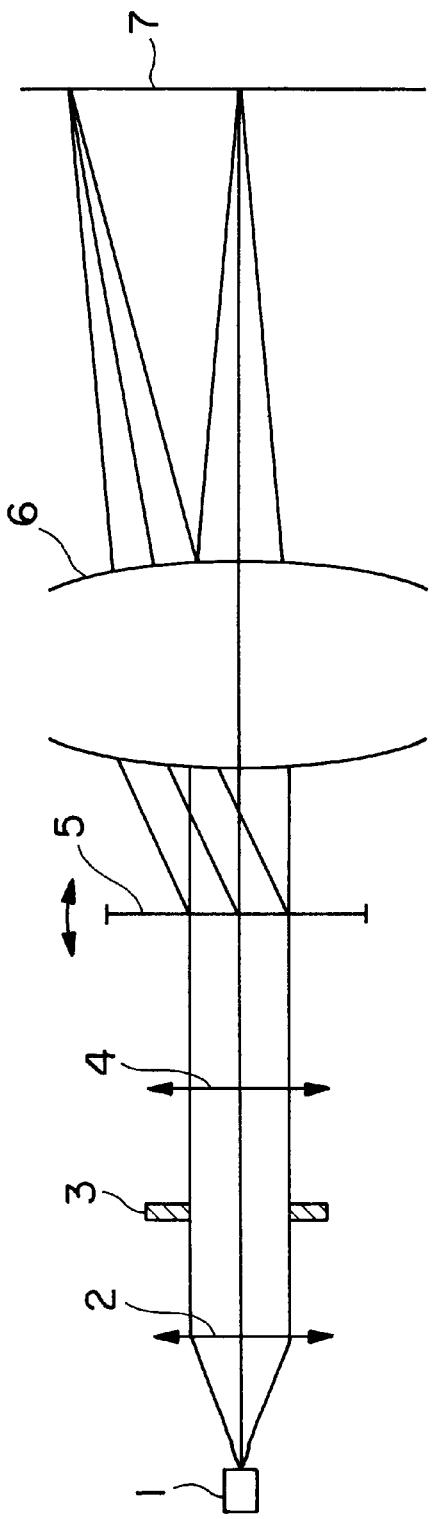
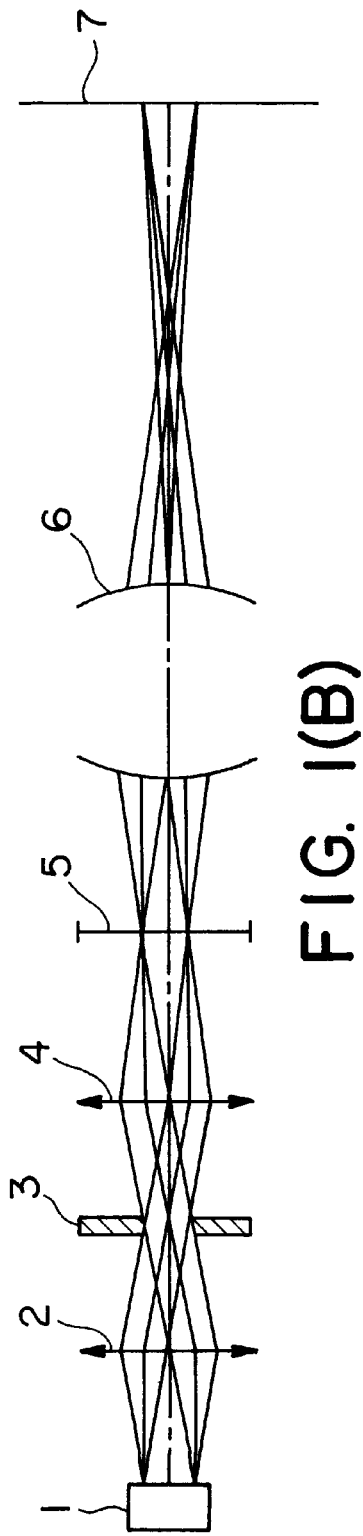
FIG. 1(A)
FIG. 1(B)

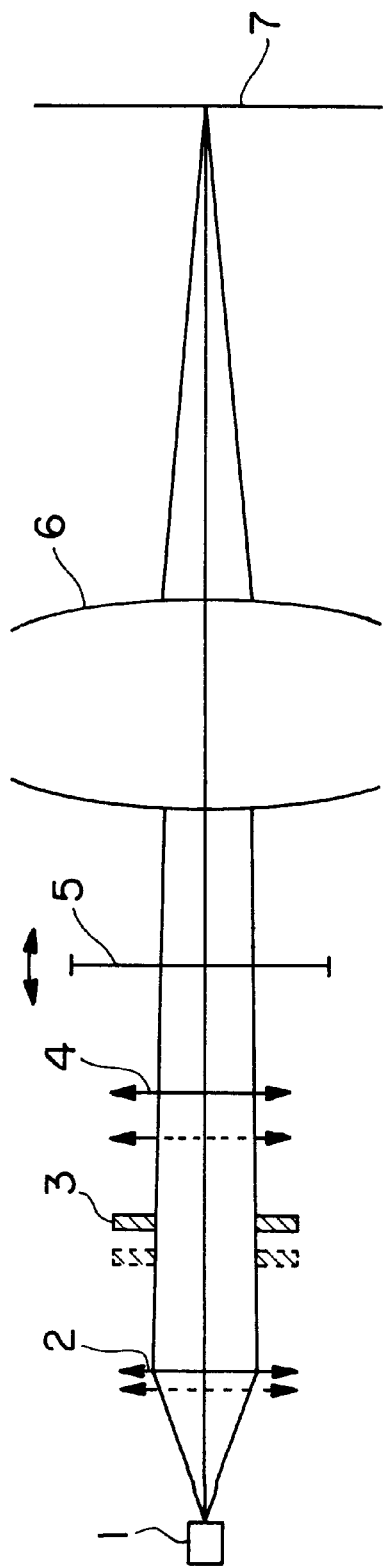
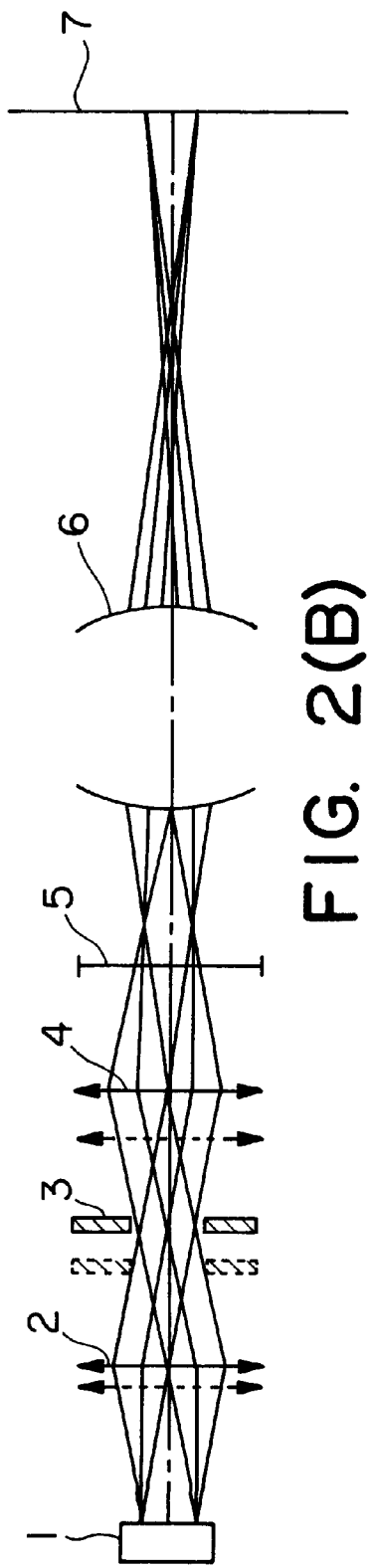

MULTIPLE BEAM SCANNING OPTICAL SYSTEM

BACKGROUND OF THE INVENTION

1. Field of the Invention

The present invention relates to a scanning optical system that scans a surface by use of multiple light beams, and more particularly, to a passive thermal compensation mechanism for maintaining the apparent position of an aperture in the multiple beam scanning optical system though a change in temperature.

2. Description of the Related Art

Multiple beam scanning optical systems in which multiple light sources are used, such as those disclosed in U.S. Pat. Nos. 5,300,956 and 5,471,236, for example, are conventionally known. These multiple beam scanning optical systems have an aperture to regulate the diameters of the multiple beams.

However, in conventional scanning optical systems, when there is a change in the environment, or more particularly when the ambient temperature changes, the oscillating wavelengths of the laser diodes fluctuate, and at the same time changes in the configuration and refractive index of the condenser lens occur. During the time the focal length of the condenser lens fluctuates, because the construction is not such that the aperture is moved in response to the temperature change, a portion of the light beams that should pass through the aperture is blocked by the aperture and the intensities and intensity distributions of the beams on the scanned surface after passing through the aperture change. This is because the aperture is no longer at the image side focal point of the condenser lens, i.e., a position at which the laser beams projected through the condenser lens cross the optical axis.

Thermal compensation in camera systems is also known, such as disclosed in U.S. Pat. Nos. 1,325,936 and 2,533,478. In these patents, the thermal expansion of cantilevered lens supports adjust the position of lens elements to maintain focus through temperature changes. A thermalized optical imaging systems are also known from, for example, U.S. Pat. No. 5,283,695, which also discloses a cantilevered lens support. Being drawn to camera systems and single beam scanning systems, however, these patents do not address the problems caused by a shift in the apparent position of an aperture in a multiple beam scanning optical system. In a multiple beam scanning optical systems, as explained above, if the aperture is moved in response to the temperature change, a portion of one or both of the light beams that should pass through the aperture is blocked by the aperture and the intensities and intensity distributions of the beams on the scanned surface after passing through the aperture. This problem would not be relevant to a camera system or a single beams optical system, which are more tolerant of intensity changes and would not suffer from changes in the intensities and intensity distributions of beams on the scanned surface after passing through the aperture as multiple beam scanning optical systems do.

SUMMARY OF THE INVENTION

A main object of the present invention is to provide a multiple beam scanning optical system which is not adversely affected by foreseen changes in the environment.

Another object of the present invention is to provide a multiple beam scanning optical system in which the appropriate intensity and appropriate intensity distribution of each beam on the scanned surface change are maintained regardless of foreseen changes in ambient temperature.

These object are obtained in a multiple beam scanning optical system which scans a surface of a photosensitive member and includes a plurality of light sources; a deflecting system which deflects beams emitted from the multiple light sources; a condenser lens unit disposed between the light sources and the deflecting system and which condenses the light beams from the light sources; and aperture disposed between the condenser lens unit and the deflecting system; and a moving member which moves the aperture in a direction along an optical axis of the beams in accordance with at least a change of focal length of the condenser lens unit due to temperature change. The moving member may include a lens mount in which the condenser lens unit and the aperture are integrally mounted at a distance corresponding to the focal length of the condenser lens unit. The moving member may alternatively include a lens mount accommodating the condenser lens unit therein, a holding member holding the aperture at a distance corresponding to the focal length of the condenser lens unit, and a base member connecting the lens mount and the holding member.

The present invention may also take the form of a multiple beam scanning optical system including a plurality of light sources; a deflecting system to deflect beams emitted from the light sources; a condenser lens unit disposed between the light sources and the deflecting system; and a regulating member disposed between the condenser lens unit and the deflecting system and which regulates diameters of the beams, the regulating member being movable in a direction along an optical axis of the beams in accordance with change of a focal length of the condenser lens unit due to temperature change.

Further, the present invention includes an optical unit provided between a plurality of light sources and a deflecting system in a multiple beam scanning optical system. The optical unit includes a condenser lens which condenses the beams emitted from the light sources; a regulating member which regulates diameters of beams projected from the condenser lens; and a connecting member which connects the condenser lens and the regulating member at a distance corresponding to a focal length of the condenser lens, the connecting member being formed of materials whose amount of linear expansion per unit of temperature is approximately equal to an amount of change in the focal length of the condenser lens per unit of temperature.

These and other objects, advantages and features of the invention will become apparent from the following description thereof taken in conjunction with the accompanying drawings which illustrate specific embodiment of the invention.

BRIEF DESCRIPTION OF THE DRAWINGS

In the following description, like parts are designated by like reference numbers throughout the several drawings.

FIG. 1(A) shows the schematic construction in the main scanning direction of a multiple beam scanning optical system as one embodiment according to the present invention.

FIG. 1(B) shows the schematic construction in the sub-scanning direction of the multiple beam scanning optical system as shown in FIG. 1(A).

FIG. 2(A) shows the schematic construction in the main scanning direction of the multiple beam scanning optical system as shown in FIG. 1(A) when the ambient temperature has changed.

FIG. 2(B) shows the schematic construction in the sub-scanning direction of the multiple beam scanning optical system as shown in FIG. 1(B) when the ambient temperature has changed.

DETAILED DESCRIPTION OF THE EXEMPLARY EMBODIMENTS

Figure 3:
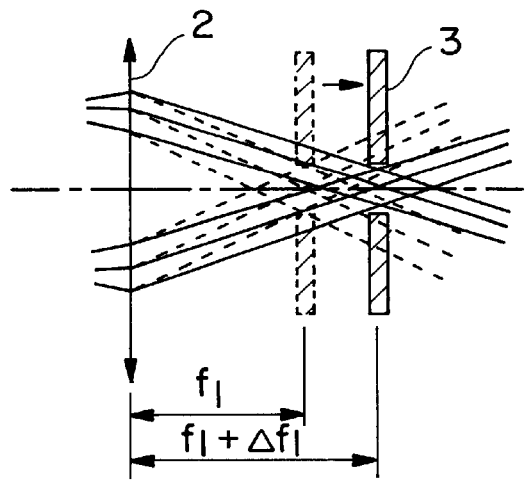
FIG. 3 shows an enlarged construction of the condenser lens and the aperture to explain their positional relationship.

FIG. 1(A) shows a schematic construction of the multiple beam scanning optical system in the plane of its scanning direction (hereinafter 'the main scanning direction'), and FIG. 1(B) shows a schematic construction of the multiple beam scanning optical system in the direction perpendicular to the main scanning direction (hereinafter 'the sub-scanning direction'), in accordance with the present invention.

The multiple beam scanning optical system comprises a laser diode array 1 that functions as the light sources, a condenser lens 2, an aperture 3, a cylinder lens 4, a polygonal mirror 5 and a scanning lens 6. The laser diode array 1 has two laser diodes $LD_1$ and $LD_2$ a that are symmetrically arranged relative to the optical axis. The laser beams projected from laser diodes $LD_1$ and $LD_2$, respectively, are converted into collimated beams by the condenser lens 2 (see FIG. 1(A)). A collimator lens, etc., for example, can be used for the condenser lens 2.

The beams projected through the condenser lens 2 are given a uniform diameter by the aperture 3 which acts as a beam diameter regulating member. The aperture 3 is a plate-like member having a hole at its center in this exemplary embodiment. However, the regulating member can be the boundaries of a mirror or an additional lens, for instance. It is located near the image side focal point of the condenser lens 2. A mechanism (described below) is employed to maintain the aperture 3 at a position at which the laser beams projected through the condenser lens 2 cross the optical axis such that a part of the laser beams which should pass through the aperture will not be blocked by the aperture 3 even if the ambient temperature changes. The laser beams passing through the aperture 3 reach the polygonal mirror 5 via the cylinder lens 4 which functions as a polygonal mirror diagonal slant angle correction lens.

The polygonal mirror 5 is driven to rotate by a motor (not shown). The laser beams are scanned by this polygonal mirror 5 at a certain angular speed and are projected on the scanning lens 6. An fθ lens, etc., for example, is used for the scanning lens 6. The scanning lens 6 corrects the laser beams that are scanned at a certain angular speed, converting them into laser beams having a fixed linear speed. Each of the two laser beams passing through the scanning lens 6 is projected onto a surface such as a photosensitive drum 7, for example.

In the multiple beam scanning optical system of the construction described above, when the ambient temperature changes from T to T+ΔT, the wavelengths of laser diodes $LD_1$ and $LD_2$ change from λ to λ+Δλ, and at the same time the configuration and refractive index of the condenser lens 2 changes. As a result, the focal length of the condenser lens 2 changes from $f_1$ to $f_1+\Delta f_1$. The configurations of the cylinder lens 4 and the scanning lens 6 similarly change, and their refractive indices change as well. As a result, the focal length of the cylinder lens 4 changes from $f_2$ to $f_2+\Delta f_2$, the focal length of the scanning lens 6 in the main scanning direction changes from $f_3$ to $f_3+\Delta f_3$, and the focal length of the scanning lens 6 in the sub-scanning direction changes from $f_4$ to $f_4+\Delta f_4$.

Consequently, correction in response to the change in ambient temperature becomes necessary in both the main and sub-scanning directions. In other words, as shown in FIGS. 2(A) and 2(B), the condenser lens 2 and the cylinder lens 4 are each moved by prescribed amounts along the optical axis in order to change the distance between the laser diode array 1 and the condenser lens 2, as well as the distance between the condenser lens 2 and the cylinder lens 4, such that the laser beams form focused images on the photosensitive drum 7 regardless of the change in ambient temperature by ΔT. In FIGS. 2(A) and 2(B), the pre-correction positions of the various optical elements 2 through 4 are indicated by dotted lines. In the main scanning direction, the laser beams projected through the condenser lens 2 are converted into slightly converging or diverging, depending on the conditions) light beams in order to compensate for change $\Delta f_3$ in the focal length of the scanning lens 6 (see FIG. 2(A)).

On the other hand, positional correction for the aperture 3 takes place by moving the aperture 3 along the optical axis by $\Delta f_1$ in addition to the distance over which the condenser lens 2 was moved. Looking only at the positional relationship between the condenser lens 2 and the aperture 3 as shown in FIG. 3, when the focal length of the condenser lens 2 changes from $f_1$ to $f_1+\Delta f_1$, the two laser beams cross each other in the sub-scanning direction at a point on the optical axis that is located at distance $f_1+\Delta f_1$ from the condenser lens 2. Therefore, the aperture 3 which is located at distance $f_1$ from the condenser lens 2 is moved along the optical axis by $\Delta f_1$ for the purpose of positional correction. Consequently, the aperture 3 no longer blocks the laser beams which should pass through the aperture and the conventional problem of a decrease in the amount of light resulting from blocking by the aperture 3 of a part of the laser beams that should pass through the aperture 3 is resolved.

Figure 4:
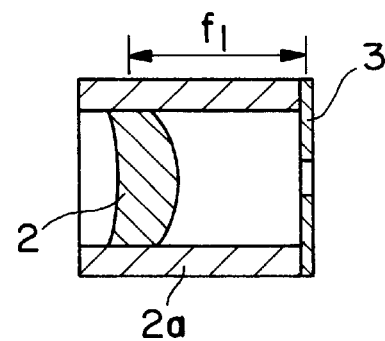
FIG. 4 is a cross-sectional view showing a mounting structure of the aperture fixed to the condenser lens.

FIG. 4 shows one specific example of a mounting structure for the aperture 3. The aperture 3 is fixed to a cylindrical lens mount 2a of the condenser lens 2 in the reference temperature condition at a position that is a distance $f_1$ from the principal point of the condenser lens 2, and thus the condenser lens 2 and the aperture 3 comprise a single unit. The cylindrical lens mount 2a is fixed relative to the rest of the optical at its end adjacent the condenser lens 2 to allow for the movement of both the consenter lens 2 and the aperture 3 as shown in FIGS. 2(A) and 2(B). For the material of the lens mount 2a, a material is used whose amount of linear expansion per unit of temperature is approximately equal to an amount of change in focal length of the condenser lens 2 per unit of temperature. For example, where focal length $f_1$ of the condenser lens 2 is 16.5 mm and the amount of change in focal length per unit of temperature (e.g., ° C.) is 5 μm, a material whose amount of linear expansion per unit of temperature (e.g., $25\times10^{-5}$ mm/° C.) is $25\times10^{-5}$ mm is used for the material of the lens mount 2a. Using the simple construction described above, positional correction of the aperture 3 can be easily and simultaneously performed by moving the condenser lens 2 to perform correction. The lens mount 2a may be formed of two or more different materials to obtain the correct amount of movement for the condenser lens 2 and the aperture 3 with respect to each other and to the overall optical system. For instance, the material between the portion of the lens mount 2a fixed to the optical system and the condenser lens 2 may have a first rate of thermal expansion, whereas the material of the lens mount between the condenser lens 2 and the aperture 3 may have a different rate of thermal expansion. Naturally, the thermal expansion of other parts of the system, such as the housing of the optical elements, can be taken into consideration in refining the positional correction using a total optical system analysis, if necessary.

Figure 5:
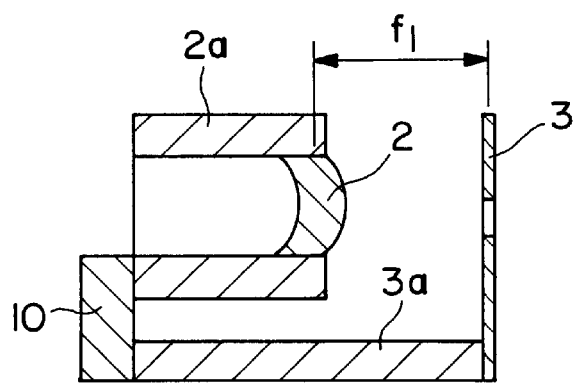
FIG. 5 is a cross-sectional view showing another mounting structure of the aperture fixed to the condenser lens.

FIG. 5 shows another specific example of a mounting structure of the aperture 3. The aperture 3 is bonded via a base member 10 (which is fixed relative to the rest of the optical system) and a holding member 3a to the lens mount 2a of the condenser lens 2 to form a single unit such that a distance $f_1$ exist between a principal point of the condenser lens 2 and the aperture 3. The materials for the lens mount 2a and the holding member 3a are selected such that the difference in the amount of linear expansion per unit of temperature between the lens mount 2a and the holding member 3a is approximately equal to an amount of change in focal length of the condenser lens 2 per unit of temperature. For example, where focal length $f_1$ of the condenser lens 2 and the amount of change in focal length per unit of temperature are 16.5 mm and 5 μm, respectively, the construction is designed such that the difference in the amount of linear expansion per unit of temperature between the lens mount 2a and the holding member 3a is $25\times10^{-5}$ mm (e.g., $25\times10^{-5}$ mm/° C.). Again, this embodiment allows for movement of both the condenser lens 2 and the aperture 3 relative to the rest of the optical system, as shown in FIGS. 2(A) and 2(B).

The scanning optical system according to the present invention is not limited to the embodiments described above, but variations may be made within the scope of the invention.

Figure 6:
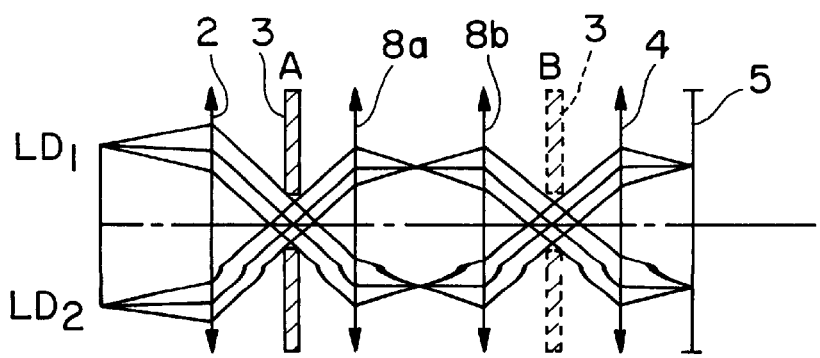
FIG. 6 shows the schematic construction of the multiple beam scanning optical system as another embodiment according to the present invention.

The embodiment may be that shown in FIG. 6, in which two beam expanders 8a and 8b are placed between the condenser lens 2 and the cylinder lens 4 and the aperture 3 is located near either the image side focal point of the condenser lens 2 (position A in the drawing) or the image side focal point of one of the beam expanders 8b (position B in the drawing). In this case, the positional relationship between the aperture 3 and the condenser lens 2 or the positional relationship between the aperture 3 and the beam expander 8b change in response to a change in temperature by employing a construction similar to those shown in FIGS. 4 and 5 described above.

In addition, the condenser lens 2 and the aperture 3, or the beam expander 8a and the aperture 3, need not necessarily be placed together in a unified fashion. It is also acceptable if they are individually fixed to a housing of the optical system, the lens and aperture mounts moving relative to the housing, though the thermal expansion of the housing may have to be considered if it is significant.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A multiple beam scanning optical system which scans a surface of a photosensitive member, said multiple beam scanning optical system comprising:
   a plurality of light sources;
   a deflecting system which deflects beams emitted from said multiple light sources;
   a condenser lens unit disposed between said light sources and said deflecting system and which condenses the light beams from the light sources;
   an aperture disposed between said condenser lens unit and the deflecting system; and
   a moving member which moves said aperture in a direction along an optical axis of the beams in accordance with at least a change of a focal length of the condenser lens unit due to temperature change.

2. A multiple beam scanning optical system as claimed in claim 1 wherein said moving member includes a lens mount in which the condenser lens unit and the aperture are integrally mounted at a distance corresponding to the focal length of the condenser lens unit.

3. A multiple beam scanning optical system as claimed in claim 2 wherein said lens mount is formed of materials whose amount of linear expansion per unit of temperature is approximately equal to an amount of change in the focal length of the condenser lens unit per unit of temperature.

4. A multiple beam scanning optical system as claimed in claim 1 wherein said moving member includes a lens mount accommodating the condenser lens unit therein, a holding member holding the aperture at a distance corresponding to the focal length of the condenser lens unit, and a base member connecting said lens mount and the holding member.

5. A multiple beam scanning optical system as claimed in claim 4 wherein materials for the lens mount and the holding member are selected from such that the difference in the amount of linear expansion per unit of temperature between the lens mount and the holding member is approximately equal to an amount of change in the focal length of the condenser lens unit.

6. A multiple beam scanning optical system as claimed in claim 1 wherein the deflecting system includes a polygonal mirror.

7. A multiple beam scanning optical system as claimed in claim 1 further comprising:
   a cylinder lens disposed between the aperture and the deflecting system; and
   a scanning lens disposed between the deflecting system and the surface of the photosensitive member.

8. A multiple beam scanning optical system comprising:
   a plurality of light sources;
   a deflecting system to deflect beams emitted from said light sources;
   a condenser lens unit disposed between said light sources and said deflecting system; and
   a regulating member disposed between said condenser lens unit and the deflecting system and which regulates diameters of the beams, said regulating member being movable in a direction along an optical axis of the beams in accordance with change of a focal length of the condenser lens unit due to temperature change.

9. A multiple beam scanning optical system as claimed in claim 8 wherein said regulating member is integrally accommodated in a lens mount with the condenser lens unit at a distance corresponding to the focal length of the condenser lens unit.

10. A multiple beam scanning optical system as claimed in claim 9 wherein said lens mount is formed of materials whose amount of linear expansion per unit of temperature is approximately equal to an amount of change in the focal length of the condenser lens per unit of temperature.

11. A multiple beam scanning optical system as claimed in claim 8 further comprising:
 a lens mount which accommodates the condenser lens unit therein;
 a holding member which holds the regulating member at a distance corresponding to the focal length of the condenser lens unit; and
 a base member which connects said lens mount and said holding member.

12. A multiple beam scanning optical system as claimed in claim 11 wherein materials for the lens mount and the holding member are selected from such that the difference in the amount of linear expansion per unit of temperature between the lens mount and the holding member is approximately equal to an amount of change in the focal length of the condenser lens unit.

13. A multiple beam scanning optical system as claimed in claim 8 wherein the deflecting system includes a polygonal mirror.

14. A multiple beam scanning optical system as claimed in claim 8 further comprising:
 a cylinder lens disposed between the regulating member and the deflecting system; and
 a scanning lens disposed between the deflecting system and a surface to be scanned.

15. A multiple beam scanning optical system as claimed in claim 8 wherein the regulating member includes an aperture.

16. An optical unit provided between a plurality of light sources and a deflecting system in a multiple beam scanning optical system, said optical unit comprising:
 a condenser lens which condenses the beams emitted from the light sources;
 a regulating member which regulates diameters of beams projected from said condenser lens; and
 a connecting member which connects the condenser lens and the regulating member at a distance corresponding to a focal length of said condenser lens, said connecting member being formed of materials whose amount of linear expansion per unit of temperature is approximately equal to an amount of change in the focal length of the condenser lens per unit of temperature.

17. An optical unit as claimed in claim 16 wherein said regulating member includes an aperture.

18. An optical unit as claimed in claim 16 wherein said connecting member includes a lens mount.

19. A support system provided between a plurality of light sources and a deflecting system in a multiple beam scanning optical system, said support system comprising:
 a first support member which supports a condenser lens for condensing the beams emitted from the light sources;
 a second support member which supports a regulating member at a distance corresponding to a focal length of said condenser lens, said regulating member regulating diameters of beams projected from said condenser lens; and
 a connecting member which connects said first support member and said second support member, materials for the first support member and the second support member being selected from such that the difference in the amount of linear expansion per unit of temperature between the first support member and the second support member is approximately equal to an amount of change in the focal length of the condenser lens.

20. A supporting system as claimed in claim 19 wherein said regulating member includes an aperture.

21. A supporting system as claimed in claim 19 wherein said first support member includes a lens mount.

22. A multiple beam optical system for exposing an imaging surface to multiple beams, said multiple beam optical system comprising:
 a plurality of light sources;
 a condenser lens unit disposed between said light sources and said imaging surface and which condenses the light beams from the light sources;
 an aperture disposed between said condenser lens unit and said imaging surface; and
 a moving member which moves said aperture in a direction along an optical axis of the beams in accordance with at least a change of a focal length of the condenser lens unit due to temperature change.

23. A multiple beam optical system as claimed in claim 22, wherein said moving member includes a lens mount in which the condenser lens unit and the aperture are integrally mounted at a distance corresponding to the focal length of the condenser lens unit.

24. A multiple beam optical system as claimed in claim 23, wherein said lens mount is formed of materials whose amount of linear expansion per unit of temperature is approximately equal to an amount of change in the focal length of the condenser lens unit per unit of temperature.

25. A multiple beam optical system as claimed in claim 22, wherein said moving member includes a lens mount accommodating the condenser lens unit therein, a holding member holding the aperture at a distance corresponding to the focal length of the condenser lens unit, and a base member connecting said lens mount and the holding member.

26. A multiple beam optical system as claimed in claim 25, wherein materials for the lens mount and the holding member are selected from such that the difference in the amount of linear expansion per unit of temperature between the lens mount and the holding member is approximately equal to an amount of change in the focal length of the condenser lens unit.

27. A multiple beam optical system for forming an image surface to multiple beams, said multiple beam optical system comprising:
 a plurality of light sources;
 a condenser lens unit disposed between said plurality of light sources and said imaging surface, said condenser lens unit condensing the light beams from said plurality of light sources;
 an aperture disposed between said condenser lens unit and said imaging surface at a position where a principal rays of the light beams cross an optical axis of the condenser lens unit; and
 a moving member which moves said aperture in direction along the optical axis of the condenser lens unit in accordance with at least a change of a focal length of the condenser lens unit due to temperature change.

28. A multiple beam optical system as claimed in claim 27, wherein said moving member includes a lens mount in which the condenser lens unit and the aperture are integrally mounted at a distance corresponding to the focal length of the condenser lens unit.

29. A multiple beam optical system as claimed in claim 28, wherein said lens mount is formed of materials whose amount of linear expansion per unit of temperature is approximately equal to an amount of change in the focal length of the condenser lens unit per unit of temperature.

30. A multiple beam optical system as claimed in claim 27, wherein said moving member includes a lens mount accommodating the condenser lens unit therein, a holding member holding the aperture at a distance corresponding to the focal length of the condenser lens unit, and a base member connecting said lens mount and the holding member.

31. A multiple beam optical system as claimed in claim 30, wherein materials for the lens mount and the holding member are selected from such that the difference in the amount of linear expansion per unit of temperature between the lens mount and the holding member is approximately equal to an amount of change in the focal length of the condenser lens unit.

* * * * *